United States Patent
Jang et al.

[11] Patent Number: 6,108,924
[45] Date of Patent: Aug. 29, 2000

[54] APPARATUS AND METHOD FOR INSPECTING FUNNEL ASSEMBLY OF CATHODE RAY TUBE

[75] Inventors: Byung Wug Jang; Moon Sun Jeong, both of Kumi, Rep. of Korea

[73] Assignee: Hankuk Electric Glass Co., Ltd., Rep. of Korea

[21] Appl. No.: 09/098,254

[22] Filed: Jun. 16, 1998

[30] Foreign Application Priority Data

Jun. 16, 1997 [KR] Rep. of Korea ............. 97-24933

[51] Int. Cl.⁷ .................................................. G01B 5/20
[52] U.S. Cl. ............................. 33/552; 33/554; 33/555
[58] Field of Search .................. 33/549–555, 1 V

[56] References Cited

U.S. PATENT DOCUMENTS

| | | | |
|---|---|---|---|
| 3,879,993 | 4/1975 | Sorbie | 33/550 |
| 4,221,053 | 9/1980 | Bobel, II et al. | 33/552 |
| 4,693,110 | 9/1987 | Juengel | 33/555 |
| 4,953,306 | 9/1990 | Weckenmann et al. | 33/552 |
| 5,014,440 | 5/1991 | Lessi et al. | 33/552 |
| 5,383,948 | 1/1995 | Muir | 65/28 |
| 5,460,058 | 10/1995 | Shadoian | 33/552 |
| 5,465,496 | 11/1995 | Axon | 33/554 |
| 5,901,455 | 5/1999 | Leitenberger et al. | 33/551 |

FOREIGN PATENT DOCUMENTS

| | | |
|---|---|---|
| 45-16367 | 6/1970 | Japan . |
| 45-31560 | 12/1970 | Japan . |
| 50-146471 | 5/1974 | Japan . |

*Primary Examiner*—Christopher W. Fulton
*Assistant Examiner*—Quyen Doan
*Attorney, Agent, or Firm*—Knobbe Martens Olson & Bear LLP

[57] ABSTRACT

An inspection apparatus for inspecting a funnel assembly of a CRT which includes a glass funnel and a glass neck attached to the vertex of the funnel and an inspection method therefor, are provided. The inspection apparatus includes a frame having a support platform for supporting the funnel assembly with the neck directed upwards, a location setting unit for maintaining the funnel at a predetermined reference location on the support platform, a detection unit which is movably installed in the frame in radial direction with respect to the axis of the neck, including a plurality of probes each for contacting the outer surface of the neck to generate a signal, and a controller for controlling a movement of the probes and estimating a geometrical state of the neck with respect to the funnel based on the signal supplied from each of the probes. Thus, a geometrical state of a neck with respect to a funnel can he accurately estimated.

17 Claims, 9 Drawing Sheets

APPARATUS AND METHOD FOR INSPECTING FUNNEL ASSEMBLY OF CATHODE RAY TUBE

BACKGROUND OF THE INVENTION

1. Field of the Invention

The present invention relates to an inspection apparatus for inspecting a funnel assembly of a cathode ray tube (CRT) and an inspection method therefor, and more particularly, to an inspection apparatus for inspecting a funnel assembly of a CRT which includes a glass funnel and a glass neck attached to the vertex of the funnel and an inspection method therefor.

2. Description of the Related Art

A CRT includes a glass panel on which images are formed, a conical glass funnel attached to the rear surface of the panel, and a tubular glass neck attached to the vertex of the funnel. An electron gun or guns for forming images are accommodated in the neck.

In the case that the axis of the neck is deviated or declined with respect to the axis of the funnel, an electron gun cannot be maintained in its proper place. In this case, a good quality of an image cannot be formed. Thus, after completion of sealing of the funnel with the neck, an inspection process of the funnel assembly is performed to measure a misalignment such as an eccentricity and a declination of the neck with respect to the funnel.

Figure 1:
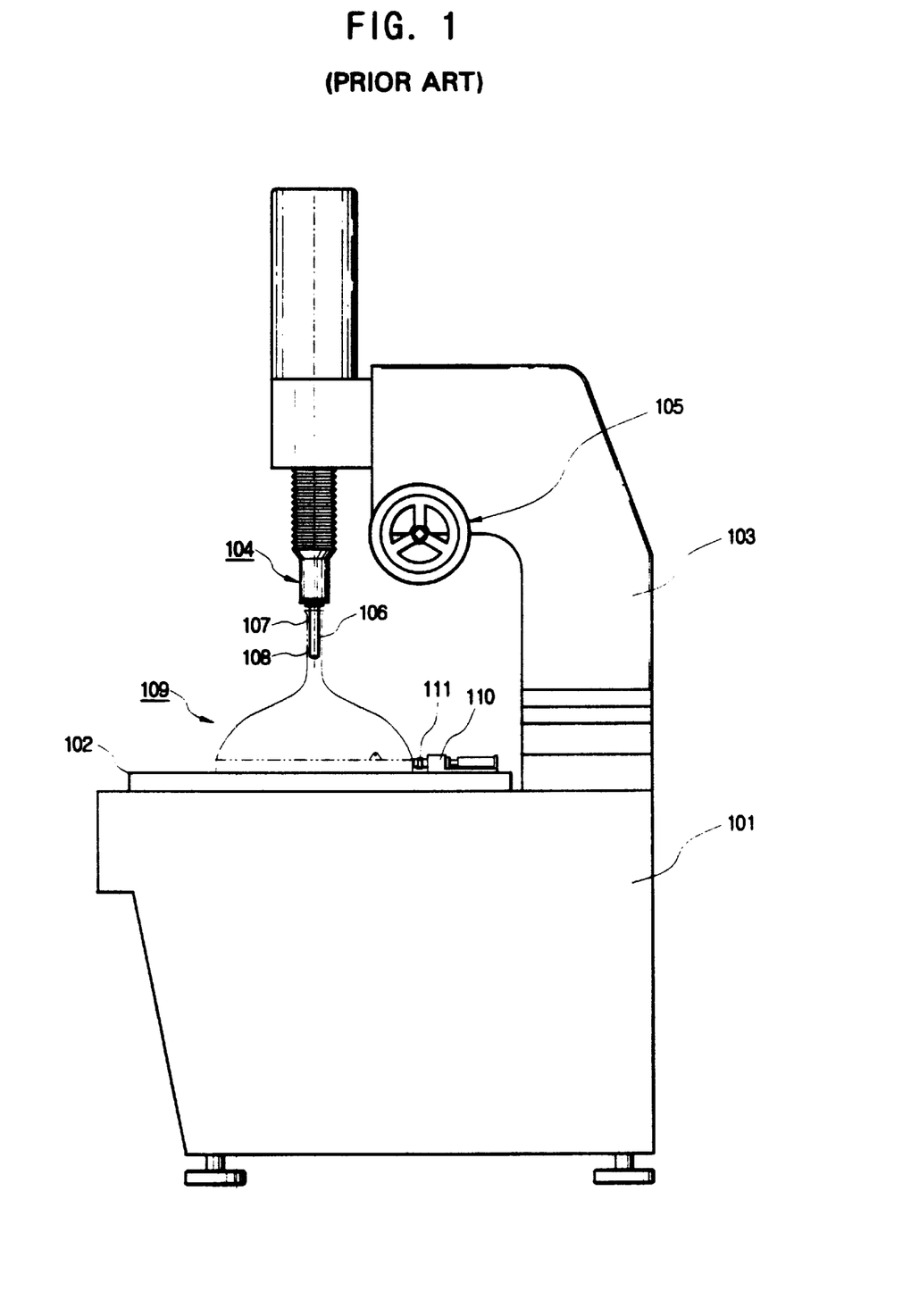
FIG. 1 is a front view showing a conventional inspection apparatus for inspecting a funnel assembly of a cathode ray tube (CRT)
Figure 2:
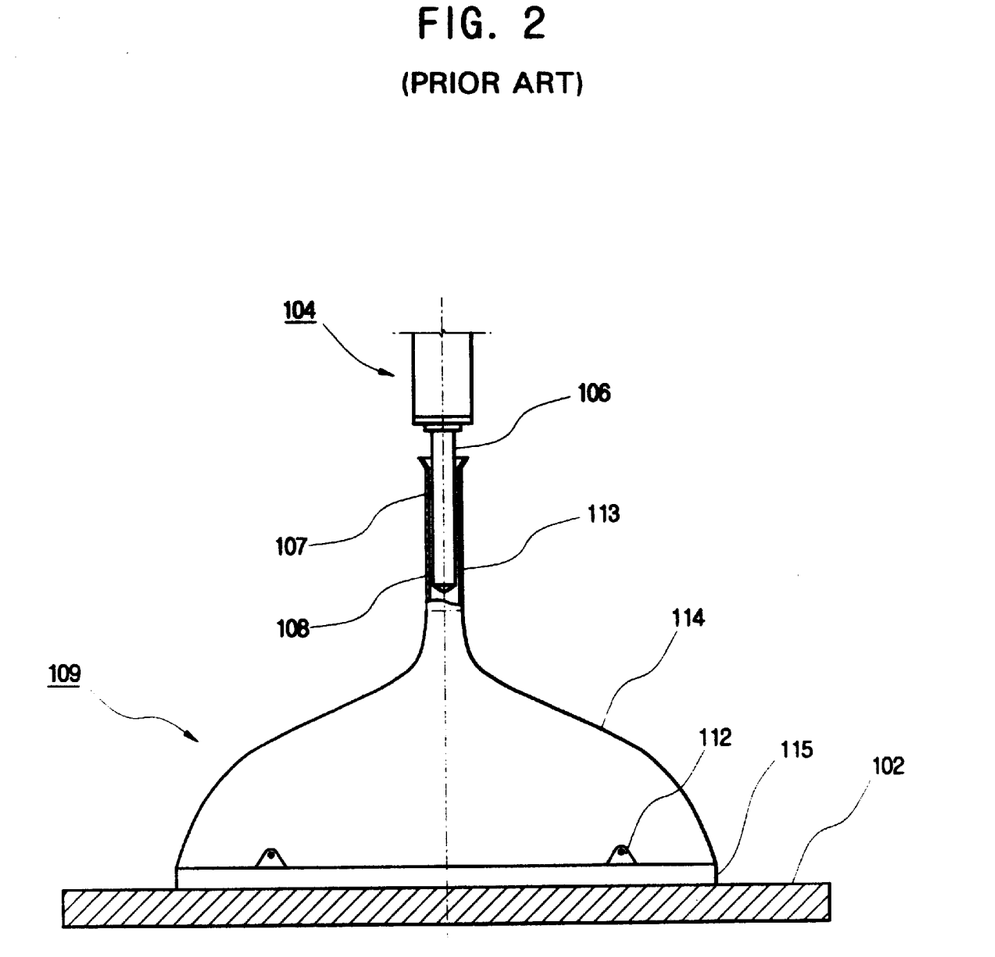
FIG. 2 is a partly enlarged front view for explaining an inspection method for inspecting a funnel assembly using the inspection apparatus of FIG. 1.

FIG. 1 is a front view showing a conventional inspection apparatus for inspecting a funnel assembly of a CRT. FIG. 2 is a partly enlarged front view for explaining an inspection method for inspecting a funnel assembly using the inspection apparatus of FIG. 1. As shown in these drawings, an inspection apparatus for inspecting a funnel assembly of a CRT (hereinafter, referred to as an inspection apparatus, simply) includes a frame 101 having a support platform 102 for supporting a funnel assembly 109 to be inspected, a stand 103 installed in the frame 101 and a detection unit 104 which is supported on the stand 103 for up and down movement. A manually-operated steering wheel 105 is provided on the stand 103, for up and down adjustment of the detection unit 104 to set an initial location. When a manipulating button is pressed after setting the initial location, a driving unit (not shown) raises or lowers the detection unit 104.

The funnel assembly 109 to be inspected is placed on the support platform 102 with the neck 113 directed upwards. On the lower skirt 115 of the funnel 114 are provided three pads 112 indicating reference points of the funnel 114. On the support platform 102 are provided three stoppers 110 positioned in correspondence to the pads 112, for setting an inspection location of the funnel assembly 109.

The detection unit 104 includes a cylindrical probe rod 106 extended downwards along the axis of the neck 113 and upper and lower probes 107 and 108 which can protrude on and retract from the external wall of the probe rod 106. The upper and lower probes 107 and 108 are disposed on the probe rod 106 each by three at equal angles. The probes 107 and 108 provide detected signals to a controller (not shown).

By the above structure, the funnel assembly 109 to be inspected is placed on the support platform 102, and the three reference pads 112 of the funnel 114 are fixedly maintained at the state contacting each stopper 110. Then, when the manipulating button is pressed, the probe rod 106 of the detection unit 104 is descended to be inserted into the neck 113. If the detection unit 104 falls down to a predetermined location, the upper and lower probes 107 and 108 on the probe rod 106 protrude until they contact the inner wall of the neck 113 and then retract again. A signal corresponding to a protruding distance of each probe 107 or 108 is supplied to the controller. The controller estimates the eccentricity and declination of the neck 113 based on the signals corresponding to the protruding distances. The signals supplied from the three probes disposed radially in the same plane are compared with one another, to estimate the eccentricity of the neck at a corresponding height. The signals between the upper and lower probes are compared with each other, to estimate the declination of the neck.

In the above conventional inspection apparatus, an inspection is performed at the state where the probe contacts the inner wall of the neck. Accordingly, in the case where the inner diameter of the neck is larger or smaller, a corresponding detection unit should be fabricated according to the inner diameter of the neck. That is, a respective dedicated detection unit should be provided with respect to a funnel assembly of a variety of sizes. Thus, it costs much to produce a detection unit and consumes much time and working hours to replace and maintain the detection unit. Also, as being the case, a support platform supporting the funnel assembly should be replaced together.

The above conventional inspection apparatus estimates a relative location of the neck with respect to a funnel fixed at a reference inspection location by the stoppers, in order to judge whether the neck bonding is good or not. Although it has been estimated that there is a defect on eccentricity or declination of the neck, the defect may be due to a drawback in a contour such as an incorrect setting of the funnel inspection location or a distortion of the funnel itself, not due to a sealing of the neck. The conventional inspection apparatus cannot correct the above errors and instead regards it as a deficiency of the neck bonding.

SUMMARY OF THE INVENTION

To solve the above problems, it is an object of the present invention to provide an inspection apparatus and an inspection method for inspecting a funnel assembly of a CRT, which can swiftly and accurately detect an assembly states of a funnel and a neck with respect to a funnel assembly of a variety of sizes.

It is another object of the present invention to provide an inspection apparatus and an inspection method for inspecting a funnel assembly of a CRT, which can inspect the bonding state of a neck and the contour of a funnel simultaneously.

To accomplish the above object of the present invention, there is provided an inspection apparatus for inspecting a funnel assembly of a CRT including a glass funnel and a glass neck attached to the vertex of the glass funnel, the inspection apparatus comprising: a frame having a support platform for supporting the funnel assembly with the neck directed upwards; location setting means for maintaining the funnel at a predetermined reference location on the support platform; detection means which is movably installed in the frame in radial direction with respect to the axis of the neck, including a plurality of probes each for contacting the outer surface of the neck to generate a signal; and a controller for controlling a movement of the probes and estimating a geometrical state of the neck with respect to the funnel based on the signal supplied from each of the probes.

The detection means comprises a plurality of stands installed in the frame to be disposed radially with respect to the axis of the neck, and an actuator installed in each stand, to have the probe move with respect to the neck. It is preferable that at least one pair of upper and lower probes which are respectively disposed in the upper location and lower location along the axis of the neck installed in each stand, in order to simultaneously inspect the eccentricity and declination of the neck.

The location setting means can be simply constructed by comprising at least one stopper fixed on the support platform contacting the outer wall surface of the funnel, and at least one pushing unit installed on the support platform pushing the funnel against the stopper. Here, it is preferable to provide a means for varying the installation location of the stopper to inspect the funnel assembly of a variety of sizes. The stopper installation location varying means can be simply constructed by comprising a plurality of stopper fixing holes formed on the support platform in correspondence to the size of the funnel assembly to be inspected, and a fixing bolt for fixing the stopper to the fixing hole.

Also, preferably, the present invention further comprises a plurality of contour inspection probes installed on the support platform and contacting the outer wall surface of the lower skirt of the funnel so as to be spaced from one another, in which the controller estimates the shape of the lower skirt based on the signal output from the contour inspection probe.

There is also provided an inspection method for inspecting a funnel assembly including a glass funnel and a glass neck attached to the vertex of the glass funnel, the inspection method comprising the steps of: maintaining the funnel assembly at a predetermined reference location in fixed form; enabling a plurality of probes to move radially with respect to the axis of the neck, and to make contact with the outer surface of the neck; and estimating a geometrical state of the neck with respect to the funnel based on each signal output from the probe.

Here, it is preferable to further comprise the steps of: enabling a plurality of contour inspection probes to contact the outer wall surface of the lower skirt of the funnel; and estimating a geometrical state of the contour of a funnel based on each signal output from the contour inspection probes.

BRIEF DESCRIPTION OF THE DRAWINGS

The above objects and advantages of the present invention will be apparent by describing the structure and operation thereof in detail with reference to the attached drawings in which.

DETAILED DESCRIPTION OF THE INVENTION

Preferred embodiments of the present invention will be described in detail with reference to the accompanying drawings.

Figure 3:
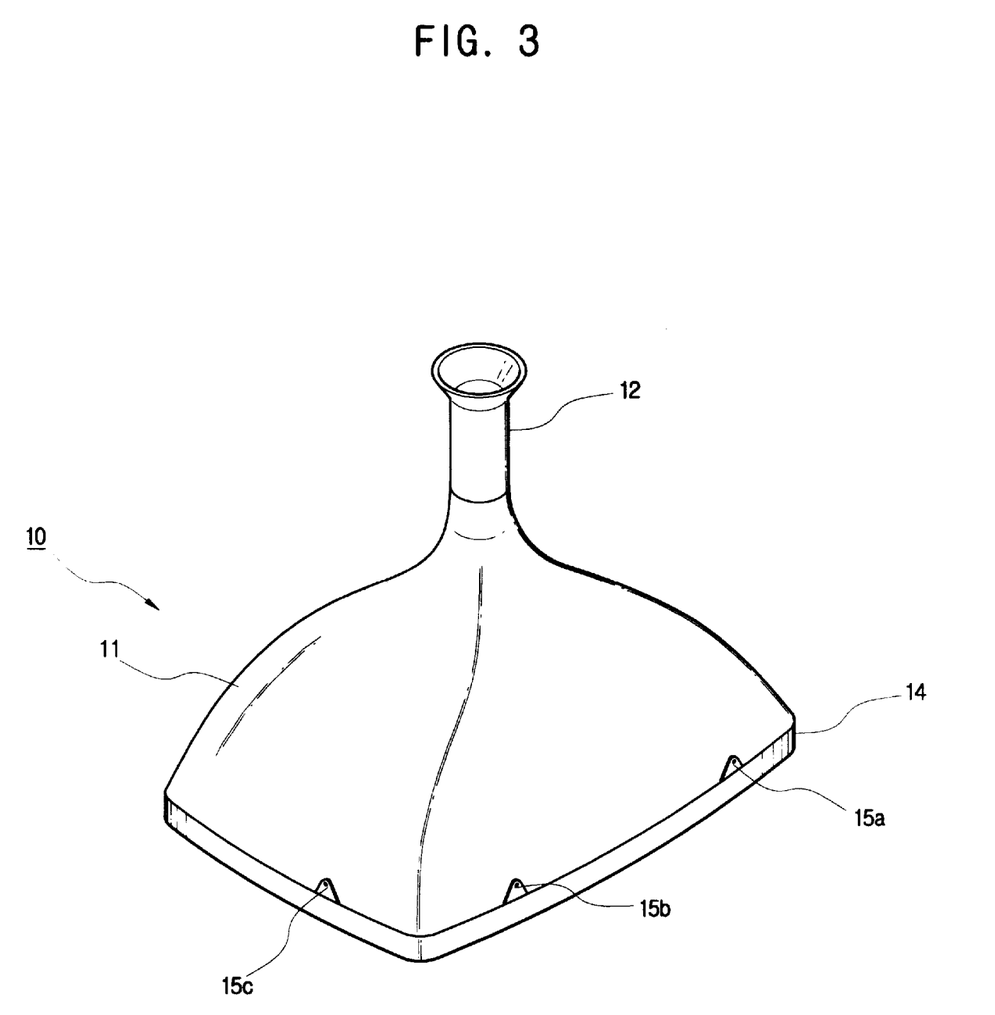
FIG. 3 is a perspective view of a funnel assembly.
Figure 4:
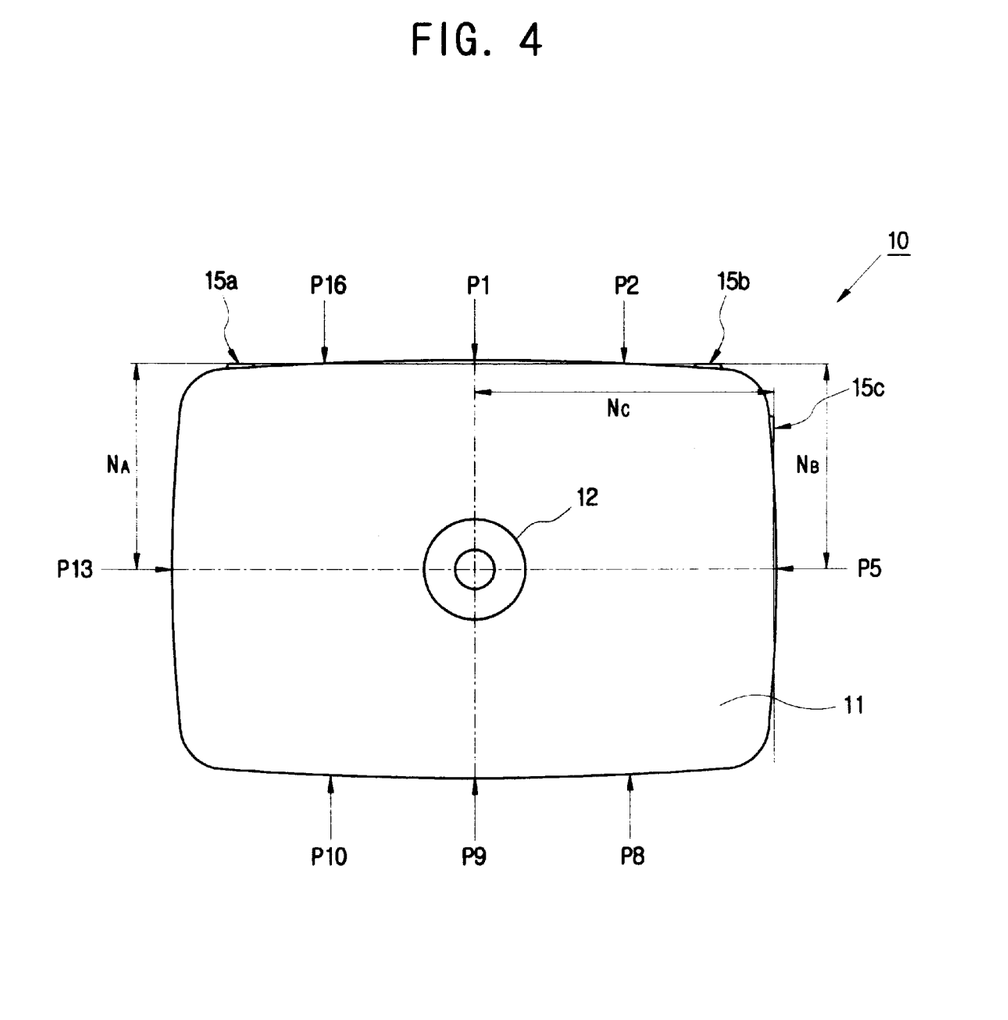
FIG. 4 is a plan view of the funnel assembly of FIG. 3.

FIG. 3 is a perspective view of a funnel assembly of a CRT to be inspected. FIG. 4 is a plan view of the funnel assembly of FIG. 3. As shown in FIGS. 3 and 4, the funnel assembly 10 includes a conical funnel 11 and a tubular neck 12 attached to the vertex of the funnel 11. On the lower portion of the funnel is formed a skirt 14 for forming a seal edge to be combined with a panel. The planar shape of the funnel 11 is substantially rectangular as shown in FIG. 4. On the skirt 14 are formed three pads 15a, 15b and 15c which become the basis of the geometrical shape of the funnel 11. Two pads 15a and 15b are disposed in one long-sidle of the funnel and one pad 15c is disposed in one short-side thereof.

Figure 5:
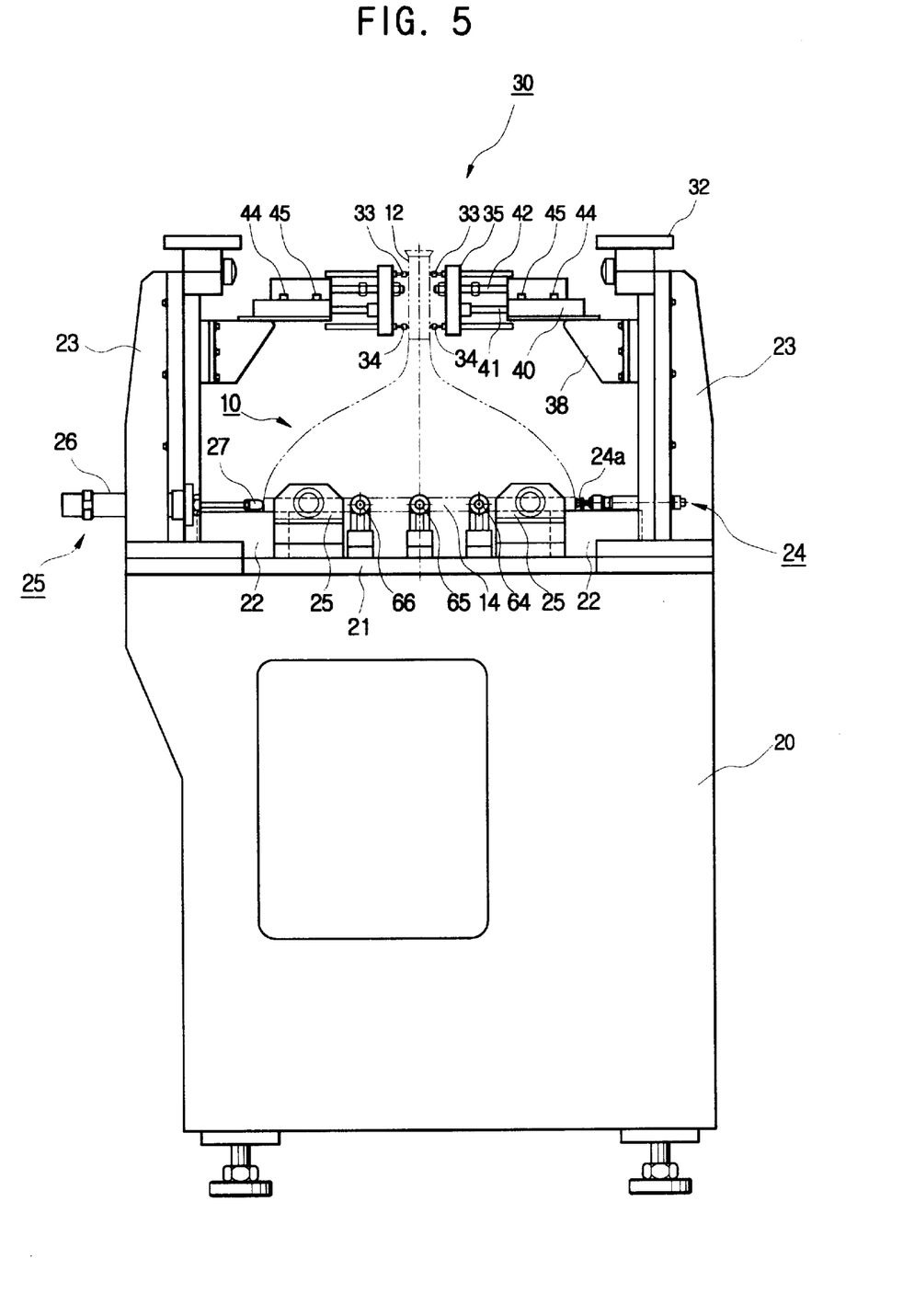
FIG. 5 is a front view showing an inspection apparatus for inspecting a funnel assembly of a cathode ray tube (CRT) according to the present invention.
Figure 6:
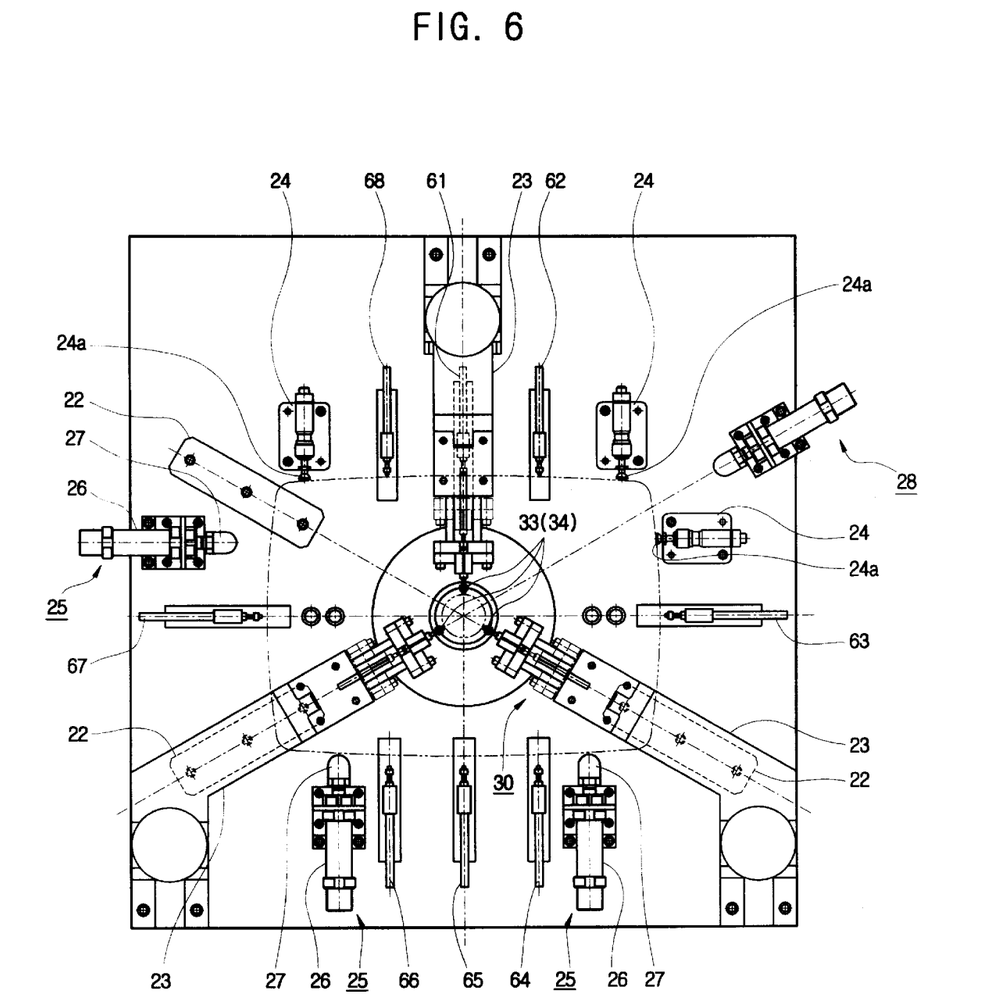
FIG. 6 is a plan view of the inspection apparatus of FIG. 5.

FIG. 5 is a front view showing an inspection apparatus for inspecting a funnel assembly of a CRT according to the present invention, and FIG. 6 is a plan view of the inspection apparatus of FIG. 5. The inspection apparatus schematically shown in FIG. 5 for convenience of explanation, is not necessarily same as that of FIG. 6. As shown in these drawings, the inspection apparatus includes a frame 20 having a flat support platform 21 thereon and three stands 23 extended upwards from the frame 20. The three stands 23 are disposed spaced at equal angles with respect to the axis of the funnel assembly 10 to be inspected. Each stand 23 supports a detection unit 30.

On the support platform 21 are installed three support blocks 22 for evenly supporting the funnel assembly 10 to be inspected. The support blocks 22 are disposed in each lower portion of the three corners of the funnel assembly 10, to contact the seal edge of the funnel 11 and support the funnel assembly 10 in horizontal direction with the neck 12 directed upwards.

On the support platform 21 are also three stoppers 24 provided in the positions corresponding to the three pads 15a, 15b and 15c of the funnel 11. Each stopper 24 includes a stop member 24a contacting the outer wall surface of the skirt 14 of the funnel 11. Three pushing units 25 are disposed against each stopper 24. Each pushing unit 25 includes a cylinder 26 and a pressing member 27 for pressing the outer wall surface of the funnel skirt 14 by the cylinder 26. If the funnel assembly 10 to be inspected is placed on the support block 22, the cylinder 26 of the pushing unit 25 is activated to have the pressing member 27 push the funnel 11 to contact the stopper 24. Accordingly, the funnel assembly 10 to be inspected becomes firmly fixed to a predetermined reference location. On the support platform 21 is also provided an ejecting unit 28 having the same form as that of the pushing unit 25. The ejecting unit 28 is disposed between the long-side stopper 24 and the short-side stopper 24 so as to push the corner portion of the funnel assembly 10, to then eject the funnel assembly 10 whose inspection has been completed.

On the support platform 21 are also eight contour inspection probes 61 through 68 which are disposed on the circumference of the funnel 11. The contour inspection probes 61–68 are disposed in correspondence to eight inspection locations P1, P2, P5, P8, P9, P10, P13 and P16 shown in FIG. 4. These probes 61–68 contact the outer wall surfaces of the skirt 14 of the funnel 11 to generate a corresponding signal, and provide the signal to a controller to be described later, so that the controller can judge whether a geometrical shape of the skirt 14 of the funnel 11 is good or bad. These probes 61–68 includes linear variable differential transformers for outputting voltages proportional to an amount of minute variation. The voltages output therefrom are converted into a horizontal movement distance value in the controller, respectively.

Each detection unit 30 is supported by a support member 38. The support member 38 is adjusted in height by a steering wheel 32 installed in the upper portion of the stand 23, so that the detection unit 30 can vary the detection position according to the size of the funnel assembly 10. The detection unit 30 includes an actuator 40 fixed on the support member 38 and a probe block 35 connected with a driving rod 41 of the actuator 40 to proceed and retract in the horizontal direction. A guide rod 42 is provided in parallel with the driving rod 41 in order to guide the probe block 35 stably in the horizontal direction. The actuator 40 is provided with a pair of limit sensors 44 and 45 for setting a respective movement limit of the driving rod 41, to control the excessive movement of the driving rod 41.

On the probe block 35 are installed a pair of upper and lower probes 33 and 34. The actuator 40 enables these probes 33 and 34 to move in the crossed direction with respect to the axis of the neck 12, that is, in radial direction to contact the outer wall surface of the neck 12, and to generate a signal at the time of its contact to then provide the generated signal to the controller to be described later. These probes 33 and 34 include linear variable differential transformers as in the contour inspection probes 61–68.

Figure 7:
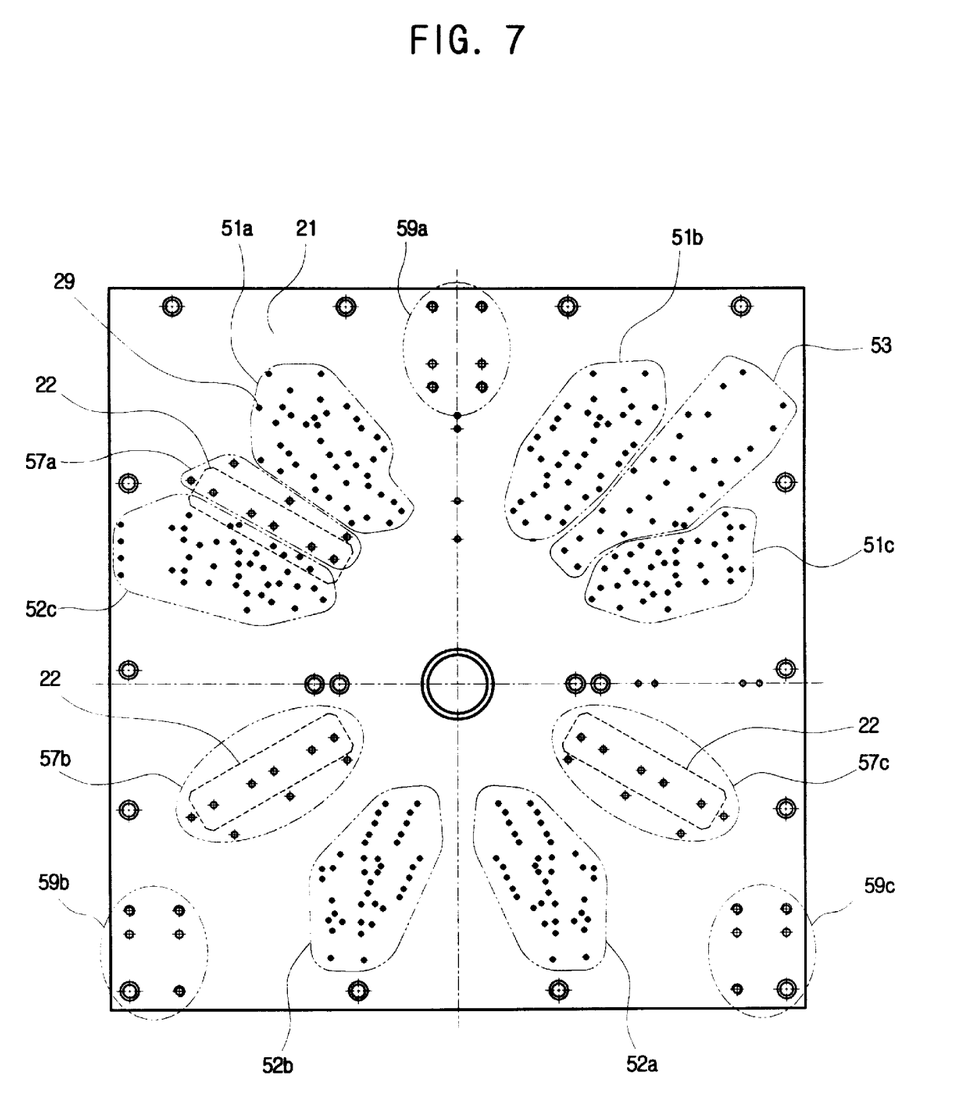
FIG. 7 is an enlarged plan view of a support platform.

FIG. 7 is a plan view of a support platform 21 in which units are not mounted on the support platform 21. A plurality of fixing holes 29 are formed on the support platform 21, to mount the support block 22, the stopper 24, the stand 23, the pushing unit 25, the ejecting unit 28, and so on therethrough. Each unit such as the support block is fixed through the fixing hole 29 by an engagement bolt. These fixing holes 29 are divided into a stopper mounting portion 51a, 51b and 51c, a support block mounting portion 57a, 57b and 57c, a pushing unit mounting portion 52a, 52b and 52c, a stand mounting portion 59a, 59b and 59c, and an ejecting unit mounting portion 53. A plurality of spare fixing holes 29 are provided in each mounting portion, in order to alter the mounting location of each unit. As a result, although the size of the funnel assembly 10 to be inspected is altered, the installation location of each unit can be properly altered. Thus, the funnel assemblies 10 whose sizes differ from each other, e.g., a funnel assembly of a regular type having a 4:3 aspect ratio and a funnel assembly of a wide type having a 16:9 aspect ratio can be placed on a single support platform 21, to then perform an inspection.

Figure 8:
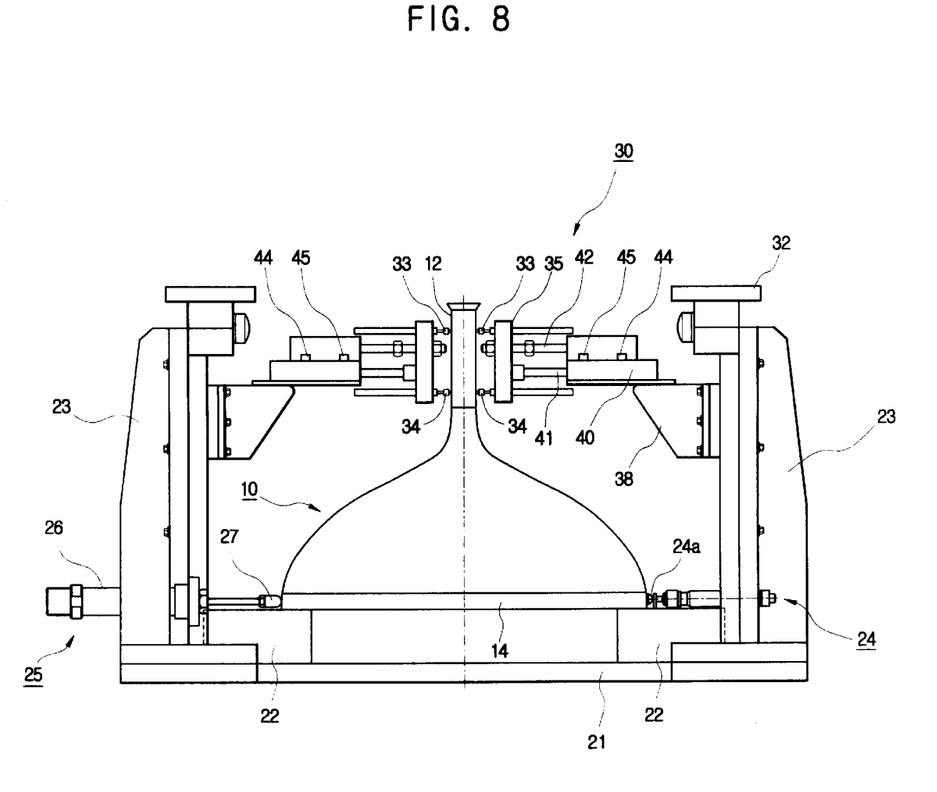
FIG. 8 is an enlarged front view for explaining an inspection process.
Figure 9:
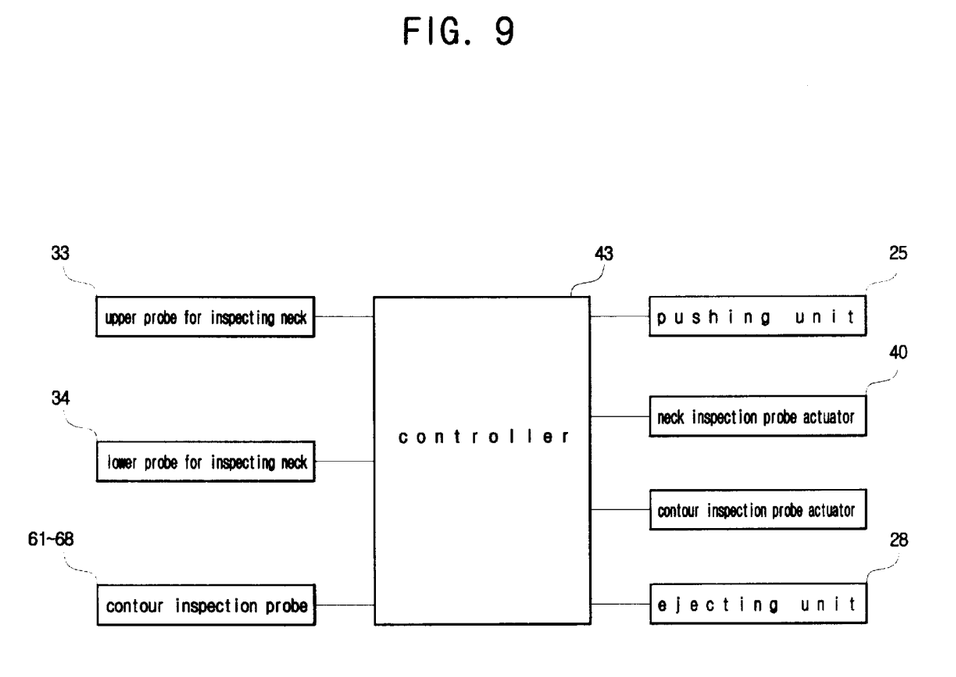
FIG. 9 is a block diagram of a control system of an inspection apparatus according to the present invention.

FIG. 8 is an enlarged front view for explaining an inspection process of the funnel assembly 10, and FIG. 9 is a block diagram of a control system of an inspection apparatus according to the present invention.

The funnel assembly 10 to be inspected is placed on the support block 22 in the support platform 21. The funnel assembly 10 is moved to a predetermined reference location in the horizontal direction by the stopper 24 and the pushing unit 25. If the funnel assembly 10 is located at the reference location, the eight contour inspection probes 61–68 contact the outer wall surface of the funnel skirt 14 according to the action of the corresponding actuator. Then, the actuator 40 of the detection unit 30 operates to have neck inspection probes 33 and 34 get close to the outer wall surface of the neck 12. The pushing unit 25, the actuators of the contour inspection probes 61–68, and the actuators 40 of the neck inspection probes 33 and 34 are controlled by the controller 43 as shown in FIG. 9.

As shown in FIG. 9, the controller 43 receives the signals from the contour inspection probes 61–68 and the neck inspection probes 33 and 34 and determines whether the contour of the skirt 14 and the neck assembly state are good or bad.

The controller 43 obtains contour parameters including distances $N_A$, $N_B$ and $N_C$ from each vertical axis to the pads 15a, 15b and 15c for setting the reference points, on the basis of the signals supplied from the contour inspection probes 61–68, and compares the obtained contour parameter values with predetermined reference values, to judge whether the contour parameter values are within an allowable range. If the contour parameters are beyond the allowable range, the controller 43 indicates that the funnel 11 is bad. Then, if it is within the allowable range, an inspection of the neck 12 is performed.

The controller 43 computes the eccentricity and declination of the neck 12 with respect to the funnel 11 on the basis of the signals from the upper and lower probes 33 and 34. The eccentricity is computed by mutually comparing the signals output from the three lower probes 34 disposed radially in the same plane or comparing the former with a predetermined reference value. The declination is estimated by mutually comparing the signal values between a pair of the corresponding upper and lower probes 33 and 34. If the eccentricity and declination are within a predetermined allowable range, the controller 43 indicates that the neck assembly state is good. Otherwise, the controller 43 indicates that it is bad.

When the contour inspection and the neck inspection are completed, the controller 43 activates the actuators 40 of the neck inspection probes 33 and 34 and the actuators of the contour inspection probes 61–68 to operate. Then, the controller 43 makes the actuators spaced from the funnel assembly 10 and releases the pushing unit 25. Then, the controller 43 activates the ejecting unit 28 and pushes the funnel assembly 10 out by a predetermined distance from the support platform 21.

As described above, in the inspection apparatus and the inspection method, the neck inspection probes contact radially the outer wall surface of the neck, to inspect the neck assembly state, which enables the inspection irrespective of the size of the funnel assembly. To do so, the units for supporting and fixing the funnel assembly are installed on the support platform so that the fixing location can be varied according to the type of the funnel assembly. Also, according to a preferred embodiment of the present invention, an inspection of the contour of the funnel can be accomplished together with an inspection of the neck. Thus, a geometrical defect such as funnel distortion can be easily inspected and a misjudgement of a neck assembly state due to the funnel assembly can be avoided.

What is claimed is:

1. An apparatus for inspecting a CRT funnel assembly which comprises a conical funnel and a neck attached to a vertex of the funnel, the neck having a central axis longitudinally passing through a center of the neck, said apparatus comprising:

a frame having a horizontal plane, the frame being configured to support the funnel assembly on the horizontal plane with the neck directed upward such that the central axis thereof is substantially perpendicular to the horizontal plane;

a funnel assembly locator installed in the frame, said funnel assembly locator locating the funnel assembly at a predetermined location on the horizontal plane by moving the funnel assembly in a horizontal direction;

a plurality of stands disposed around the predetermined funnel assembly location;

a plurality of detectors attached to each one of the stands, each one of the detectors having a probe, the probe of each detector being configured to horizontally move in a radial direction with reference to the axis toward the funnel assembly and contacting the funnel or the neck of the funnel assembly such that the detectors generate signals indicative of horizontal distances of movement of the probes with a vertical distance between the neighboring probes, whereby the probes of the detectors attached to each one of the stands can contact the funnel or the neck of the funnel assembly at different levels; and a controller controlling operation of the funnel assembly locator and the detectors, the controller receiving and analyzing the signals from the detectors to determine a geometrical state of the funnel assembly.

2. An apparatus as defined in claim 1, wherein the locations of the funnel assembly locator and the stands can be varied so as for the frame to support different sizes of the funnel assembly.

3. An apparatus as defined in claim 1, wherein the controller further determines whether the geometrical state of funnel assembly is allowable.

4. An apparatus as defined in claim 1, further comprising a plurality of second detectors installed in the frame, each one of the second detector comprising a probe at a level slightly above the horizontal plane, the probe being configured to horizontally move toward the funnel assembly and to contact the funnel assembly at the level slightly above the horizontal plane, wherein the second detectors generate signals indicative of horizontal distances of movement of the probes when contacting the funnel assembly.

5. An apparatus as defined in claim 1, wherein an upper detector and a lower detector are attached to each one of the stands, the probes of the detectors attached to each one of the stands are located in a plane perpendicular to the horizontal plane with a vertical distance therebetween, wherein the two probes of each one of the stands maintains the vertical distance when moving in the perpendicular direction.

6. An apparatus as defined in claim 1, wherein the controller determines eccentricity of the neck of the funnel assembly with the signals indicative of the horizontal distance of the movement of the probes of the detectors attached to at least two of the stands at a same level.

7. An apparatus as defined in claim 1, wherein the controller determines declination of the neck of the funnel assembly with the signals indicative of the horizontal distance of the movement of the probes of the detectors of at least one of the stands at different levels.

8. An apparatus as defined in claim 1, wherein three stands are disposed radially at a same distance from a point on the horizontal plane where the axis of the funnel assembly passes when the funnel assembly is at the predetermined location, the three stands are spaced at equal angles with respect to the point, wherein each one of the stands have two detectors, the probes of which are in line at different levels such that the probes from one stand contacts two different levels of the funnel assembly.

9. An apparatus as defined in claim 1, wherein a plurality of support blocks is provided in the frame, and the funnel assembly is supported by the support blocks.

10. An apparatus as defined in claim 1, wherein the funnel assembly locator comprises at least one pusher and at least one stopper both mounted at a level of the skirt of the funnel assembly, the at least one pusher and stopper are generally opposingly located, the pusher moves the skirt of the funnel assembly in a horizontal direction toward the predetermined location, and the stopper stops the movement of the funnel assembly when the funnel assembly reaches at the predetermined location in a horizontal direction.

11. An apparatus as defined in claim 10, wherein the controller stops the movement of the pusher in the direction when the movement of the funnel assembly in the direction is blocked by the stoppers.

12. A method of inspecting a CRT funnel assembly which comprises a conical funnel and a neck attached to a vertex of the funnel, the neck having a central axis longitudinally passing through a center of the neck, said method comprising:

supporting the funnel assembly with the neck directed upward such that the central axis thereof is substantially perpendicular to a horizontal plane;

locating the funnel assembly at a predetermined location on the horizontal plane by moving the funnel assembly in a horizontal direction;

horizontally moving each of a plurality of probes in a radial direction with reference to the axis toward the funnel assembly and contacting the funnel assembly with a vertical distance between the neighboring probes, whereby the probes of the detectors attached to each one of the stands can contact the funnel or the neck of the funnel assembly at different levels;

generating signals indicative of horizontal distances of movement of the probes; and analyzing the signals from the probes to determine a geometrical state of the funnel assembly.

13. A method for inspecting a CRT funnel assembly which comprises a conical funnel and a neck attached to a vertex of the funnel, the neck having a central axis longitudinally passing through a center of the neck, the method comprising:

locating the funnel assembly at a predetermined location on a horizontal plane with the neck directed upward, the central axis of the neck being substantially perpendicular to the horizontal plane;

measuring a horizontal distance from each of a plurality of specific locations around the funnel assembly to the funnel assembly at least two locations being in a same radial direction with reference to the axis at different levels; and determining a geometrical state of the funnel assembly by computing the distances measured.

14. A method as defined in claim 13, further comprising determining whether the geometrical state of funnel assembly is allowable.

15. A method as defined in claim 13, wherein the funnel has a circumferential skirt on an end thereof opposite the vertex, the horizontal distances are measured at a level of the skirt of the funnel assembly, and the geometrical state is a contour of the skirt.

16. A method as defined in claim 13, wherein the horizontal distances are measured at a level of the neck of the funnel assembly, and the geometrical state is eccentricity of the neck.

17. A method as defined in claim 13, wherein the horizontal distances are measured at different levels in line of the neck of the funnel assembly, and the geometrical state is declination of the neck.

* * * * *

UNITED STATES PATENT AND TRADEMARK OFFICE
CERTIFICATE OF CORRECTION

PATENT NO.    : 6,108,924
DATED         : August 29, 2000
INVENTOR(S)   : Jang et al.

It is certified that error appears in the above-identified patent and that said Letters Patent is hereby corrected as shown below:

Column 4,
Line 17, please replace "sidle" with -- side --.

Column 6,
Line 23, please replace "estimated" with -- computed --.

Column 8,
Line 44, before "at", please insert -- , --.

Signed and Sealed this

Twenty-fifth Day of September, 2001

Attest:

NICHOLAS P. GODICI
Attesting Officer
Acting Director of the United States Patent and Trademark Office